US005739982A

United States Patent [19]

Arya et al.

[11] Patent Number: 5,739,982
[45] Date of Patent: Apr. 14, 1998

[54] LASER TREATMENT OF HEAD GIMBAL ASSEMBLY COMPONENTS

[75] Inventors: Satya Prakash Arya; Darrell Dean Palmer; Surya Pattanaik, all of San Jose; Mathew Kayhan Shafe, Campbell; Randall George Simmons, San Jose, all of Calif.

[73] Assignee: International Business Machines Corporation, Armonk, N.Y.

[21] Appl. No.: 702,072

[22] Filed: Aug. 23, 1996

[51] Int. Cl.$^6$ ..................................................... G11B 5/48
[52] U.S. Cl. .................................................. 360/104
[58] Field of Search ........................................ 360/104

[56] References Cited

U.S. PATENT DOCUMENTS

| | | | |
|---|---|---|---|
| 4,151,008 | 4/1979 | Kirkpatrick | 148/1.5 |
| 4,151,014 | 4/1979 | Charschan et al. | 148/13 |
| 4,214,918 | 7/1980 | Gat et al. | 148/1.5 |
| 4,305,973 | 12/1981 | Yaron et al. | 427/35 |
| 4,409,724 | 10/1983 | Tasch, Jr. et al. | 29/571 |
| 4,476,150 | 10/1984 | Rose | 427/10 |
| 4,703,557 | 11/1987 | Nespor et al. | 29/620 |
| 5,094,977 | 3/1992 | Yu et al. | 437/174 |
| 5,170,227 | 12/1992 | Kaneko et al. | 257/67 |
| 5,405,804 | 4/1995 | Yabe | 437/773 |

Primary Examiner—A. J. Heinz
Attorney, Agent, or Firm—Noreen A. Krall

[57] ABSTRACT

Disclosed is an improved slider-suspension electrical interconnect assembly and a method of manufacturing the same. The novel integrated suspension may be assembled from separate pieces, including a load beam, a flexure and a mounting plate. The load beam provides rigid structural support of the flexure. The flexure includes a flexible member and conductive leads integrally formed thereon. The flexible member has a gimbal area to which a slider is attached. At least one transducer is attached to the slider for reading data from and writing data to a disk surface. Each of the conductive leads terminates at one end on contact pads on the end face of the slider for electrical connection to the transducer. At the slider termination end, the conductive leads comprise an altered and an unaltered section. The altered section of the conductor has a lower yield strength than the conductor surrounding the altered section, and has a more uniform grain structure than the unaltered section. The altered, stress relieved section of the conductor is formed by treating the lead at the slider termination end with localized infrared radiation.

19 Claims, 7 Drawing Sheets

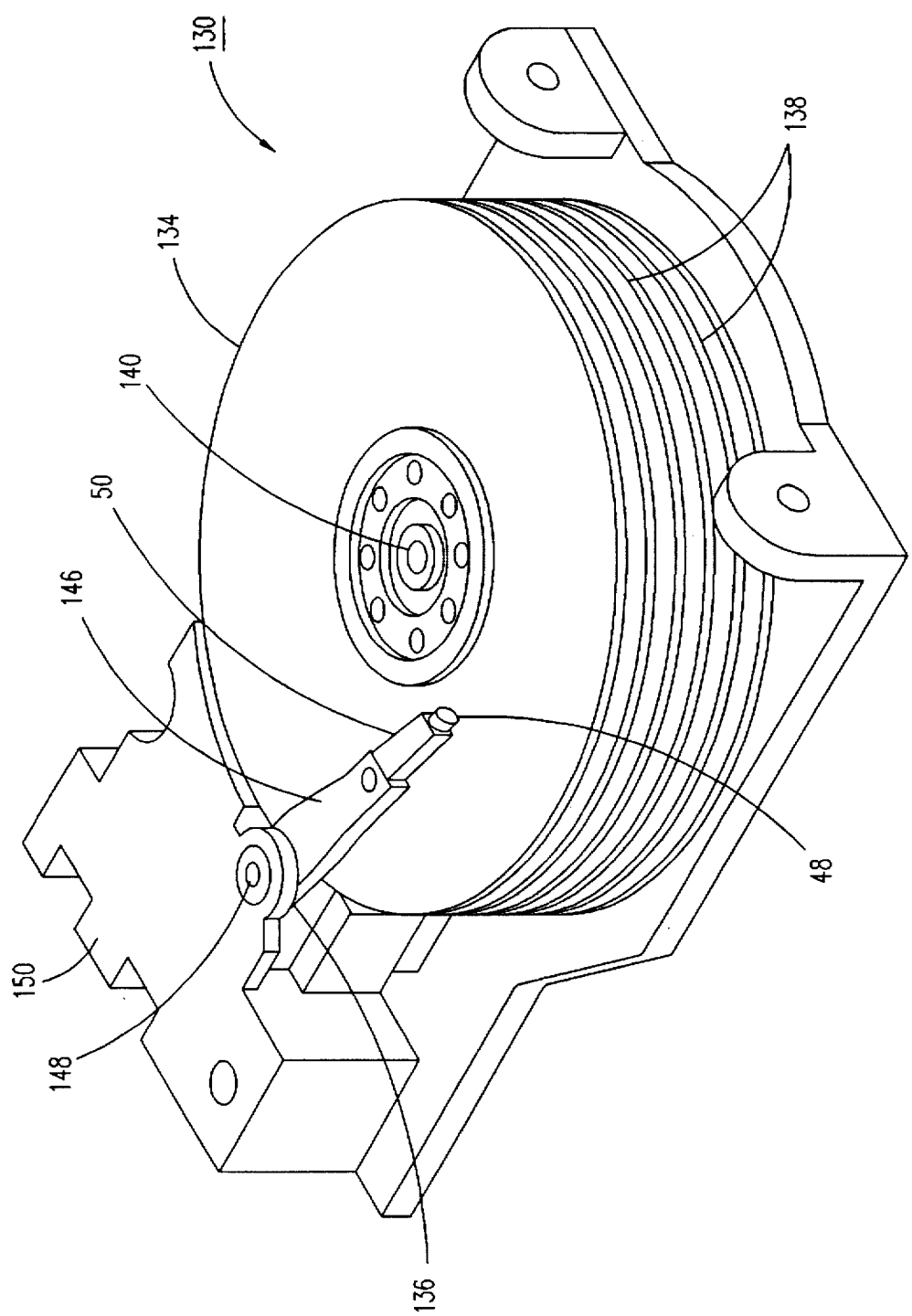

LASER TREATMENT OF HEAD GIMBAL ASSEMBLY COMPONENTS

CROSS REFERENCE TO RELATED APPLICATIONS

This application is related to commonly assigned co-pending application Ser. No. 08/644,878 filed May 10, 1996, which is incorporated herein by reference.

BACKGROUND Of THE INVENTION

1. Field of the Invention

This invention relates in general to a slider-suspension for a magnetic data recording systems, and more particularly to an improved slider-suspension electrical interconnection and a method of manufacturing the same.

2. Description of Related Art

Moving magnetic storage devices, especially magnetic disk drives, are the memory device of choice. This is due to their expanded non-volatile memory storage capability together with a relatively low cost. Accurate retrieval of the stored information from these devices becomes critical, requiring the magnetic transducer to be positioned as close to the storage media as possible. Optimally, the transducer may actually contact the media.

Magnetic disk drives are information storage devices which utilize at least one rotatable magnetic media disk having concentric data tracks defined for storing data, a read/write transducer for reading data from and/or writing data to the various data tracks, a slider for supporting the transducer adjacent the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air bearing, generated by the rotating disk. The transducer/slider/suspension assembly is often referred to as the head gimbal assembly (HGA).

Alternatively, the transducer may operate in contact with the surface of the disk. Thus the suspension provides desired slider loading and dimensional stability between the slider and an actuator arm which couples the head gimbal assembly to the actuator. The suspension is required to maintain the transducer and the slider adjacent the data surface of the disk with as low a loading force as possible. The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks.

The trend towards increasing capacity of memory storage devices has not bypassed disk drives. One attempt to increase storage capacity includes reducing the height of the magnetic transducer above the disk surface, thus permitting disks to be stacked more closely together. It is therefore desired to develop smaller integrated suspensions so as to meet the requirements of disk drive systems of smaller physical size. Due to the relatively small physical size and fragile structure of the suspension assembly, it becomes a challenge to develop integrated suspension structures that are designed for manufacturability while achieving the desired performance specifications and yield requirements. For example, one challenge has been encountered in the termination of planar electrical leads at the slider bonding pads in a head gimbal assembly. A newer type of suspension, such as that described in commonly assigned co-pending patent application Ser. No. 08/644,878 filed May 10, 1996 and incorporated herein by reference, has bent these leads at or near the slider bonding pads in order to improve stiffness and performance of the suspension, and also to improve the assembly process of the slider to the suspension. Although there have been great improvements in the manufacturability of the suspension as disclosed, it has still been found that the bending of leads may cause an increase in internal stress that results in distortions. If the internal stresses are beyond an acceptable limit, the distortions can cause an unacceptable out of flatness, or localized cracking in the components. Out of flatness in the suspension hinge area causes unacceptable high gain at certain dynamic frequencies. Moreover, out of flatness in the flexible member causes changes in the slider static attitude which, in turn, changes the slider fly height. Although predicted and constant distortions from one part to another can be corrected during the suspension manufacturing process, if the distortions vary from part to part they can not be corrected during manufacturing and therefore result in changes of the fly height of the slider over the disk from one HGA to another. Thus, these distortions arising from the bending of the leads that cause localized cracking and part to part flatness variations are a problem that limits the design freedom and optimization of HGA components for performance and low cost manufacturing.

Therefore, it can be seen that there is a need to provide a slider-suspension with an improved slider electrical interconnect assembly which has a higher tolerance to stresses.

It is seen that there is a need to provide a slider-suspension interconnect assembly wherein the conductors have an increased ductility to eliminate cracking in the conductor when bent.

It can also be seen that there is a need for an improved slider-suspension electrical interconnect assembly which allows for less torque and therefore less static attitude influence on the slider/gimbal structure after it is bonded to the slider.

It can further be seen that there is a need for an improved slider-suspension assembly which allows for the ability to fly more consistently above the disk.

It can further be seen that there is a need to improve and provide a more uniform process for manufacturing the HGA.

SUMMARY OF THE INVENTION

To overcome the limitations in the prior art described above, and to overcome other limitations that will become apparent upon reading and understanding the present specification, the present invention discloses an improved slider-suspension electrical interconnect assembly and a method of manufacturing the same. The present invention further presents a simplified integrated suspension structure that is relatively easy to manufacture. The novel integrated suspension may be assembled from separate pieces, including a load beam, a flexure and a mounting plate. The load beam provides rigid structural support of the flexure. The flexure includes a flexible member and conductive leads integrally formed thereon. The flexible member has a gimbal area to which a slider is attached. At least one transducer is attached to the slider for reading data from and writing data to a disk surface. Each of the conductive leads terminates at one end on contact pads on the end face of the slider for electrical connection to the transducer. At the slider termination end, the conductive leads comprise an altered and an unaltered section. The altered section of the conductor has a significantly lower yield strength than the conductor surrounding the altered section, and has a more ordered and uniform grain structure than the unaltered section. The altered section of the conductor is formed by treating the lead at the slider termination end with localized infrared radiation.

The integrated suspension in accordance with the present invention is a laminate structure, having a base or substrate layer, and an electrically conductive layer formed on the base layer. An electrically insulating layer separates the base layer from the conductive layer. The base layer or substrate layer may be shaped by etching or stamping processes. The insulating and conductive layers may be formed by using conventional photolithographic processes known in the art.

The localized infrared radiation used to form the altered section of the conductive lead can be from $CO_2$, Nd:YAG, or Xenon lasers, or from focused IR; all applied directly or through optical fibers to selected locations on the conductive lead. The localized infrared radiation may be applied prior to bending of the conductive lead, after bending of the conductive lead, or after ultrasonic bonding of the conductive lead to the slider. The IR radiation locally heats the high stress zone of the conductive leads, allowing easy low stress elongation of the bend zone. After heating, the remaining internal stresses in the lead, if any, are constant thereby resulting in a constant change in static attitude from part to part. Moreover, this results in a low variability in static attitude from part to part, because a constant changes in static attitude can be compensated for during fabrication processes.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 2 illustrates a plan view of a magnetic storage system including an integrated suspension assembly in accordance with the present invention;

FIGS. 8 (a)–(b) are enlarged views of the integrated conductive lead with laser treatment before bending and treatment after bending, showing the altered and unaltered sections of the leads;

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
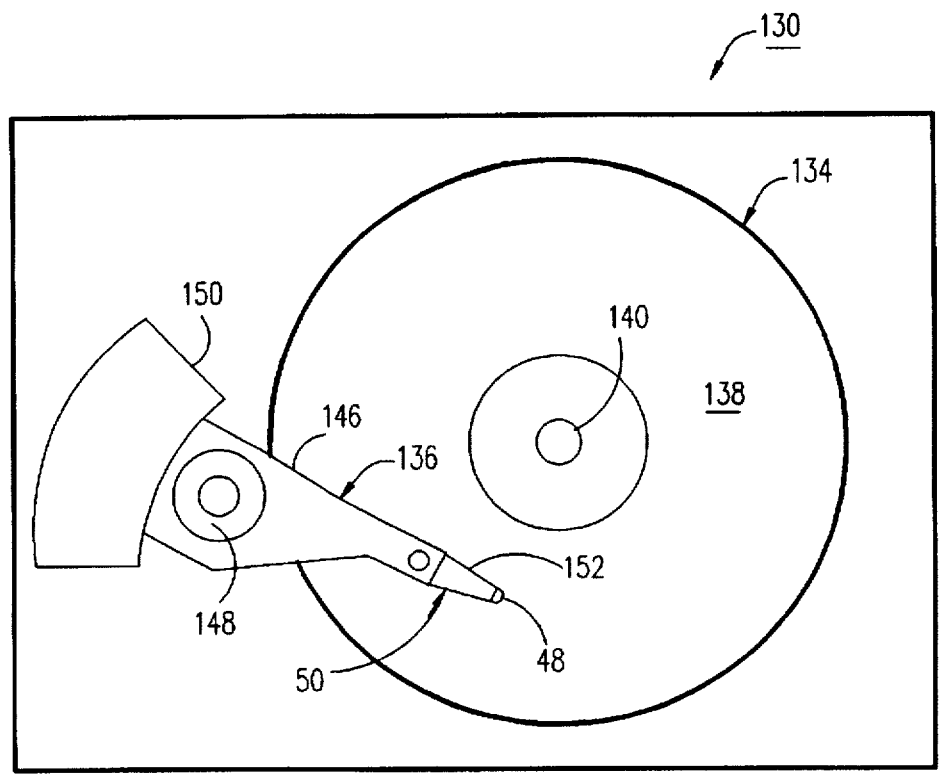
FIG. 1 illustrates top view of a magnetic storage system including an integrated suspension assembly in accordance with the present invention.
Figure 3:
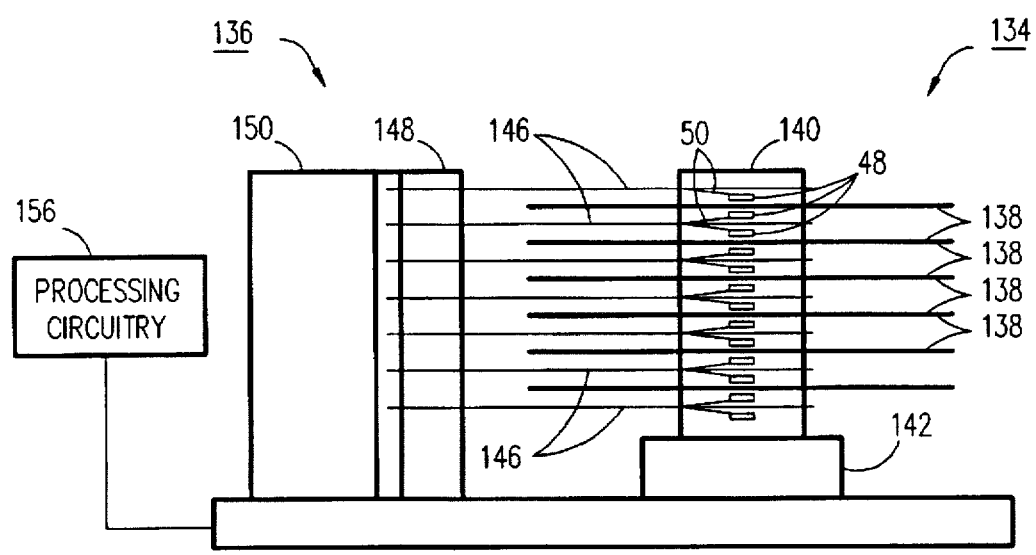
FIG. 3 is a side, sectional view of a magnetic storage system including an integrated suspension assembly in accordance with the present invention.

Referring now to FIGS. 1, 2 and 3, a disk drive 130 is illustrated, and employs a disk stack assembly 134 and a head stack assembly 136. The disk stack assembly 134 includes a plurality of vertically stacked disks 138 that are supported for rotation on a spindle 140, which in turn is rotated by a motor 142. The head stack assembly 136 includes a plurality of vertically-stacked integrated suspension assemblies 50, each assembly being mounted to a respective actuator arm 146. Each of the actuators arms 146 is mounted for rotation on an actuator hub 148 which is rotated by a voice coil 150. Each integrated suspension assembly 50 includes a load beam 58 (shown in FIG. 4), which has mounted thereon a slider 48 that carries a magnetic head (not shown) for reading and writing magnetic signals on the disk 138.

Processing circuitry 156 (See FIG. 3) is operatively connected to the spindle motor 142, the voice coil 150, and the magnetic heads (not shown) in order to rotate the disks 138, and displace the actuator arms 146 and to read and write on the disks 138, respectively. When the voice coil 150 is operated, the magnetic heads on the slider 48 are moved to selected circular tracks (not shown) on the disks 138 where information is magnetically read and magnetically written by the heads. Because of direct access to the circular tracks by simple rotation of the actuator arm 146, this type of storage device is known as direct access storage device (DASD).

Each of the suspension assemblies 50 pre-loads the respective slider 48 on the surface of the disks 138. When the disks 138 are rotated, each disk creates a cushion of air (an "air bearing") that counterbalances the pre-loading applied to the load beam 58. This counterbalancing causes the slider 48 to fly slightly off the surface of the disk 138, on the order of 0.075 microns. The surface of the slider 48 that is supported by this air bearing is known as the air bearing surface (ABS). The head suspension assembly 50 is constructed to permit slight vertical movements as well as pitch and roll of the slider 48 during rotation of the magnetic disk 138.

Figure 4:
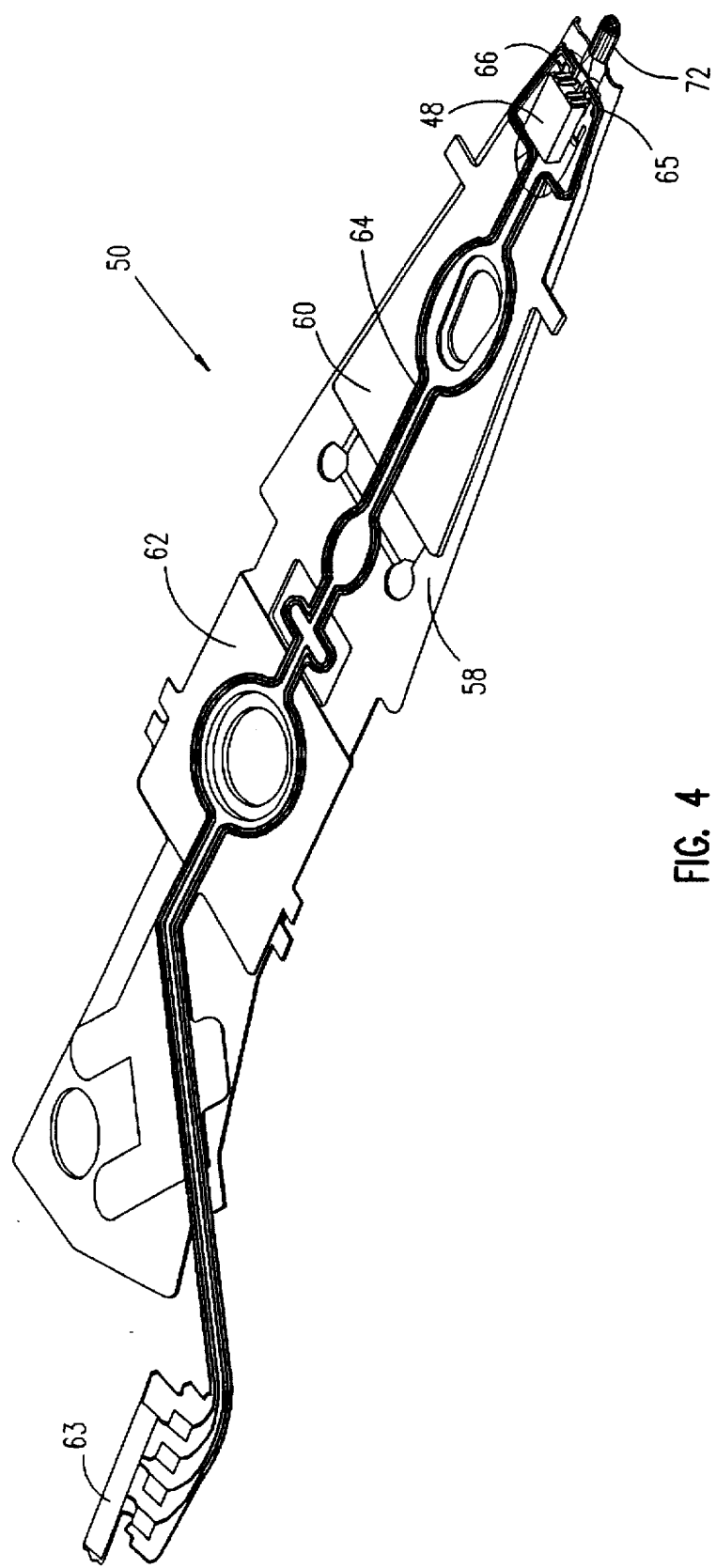
FIG. 4 is a perspective view of the integrated suspension assembly in accordance with the present invention.
Figure 5:
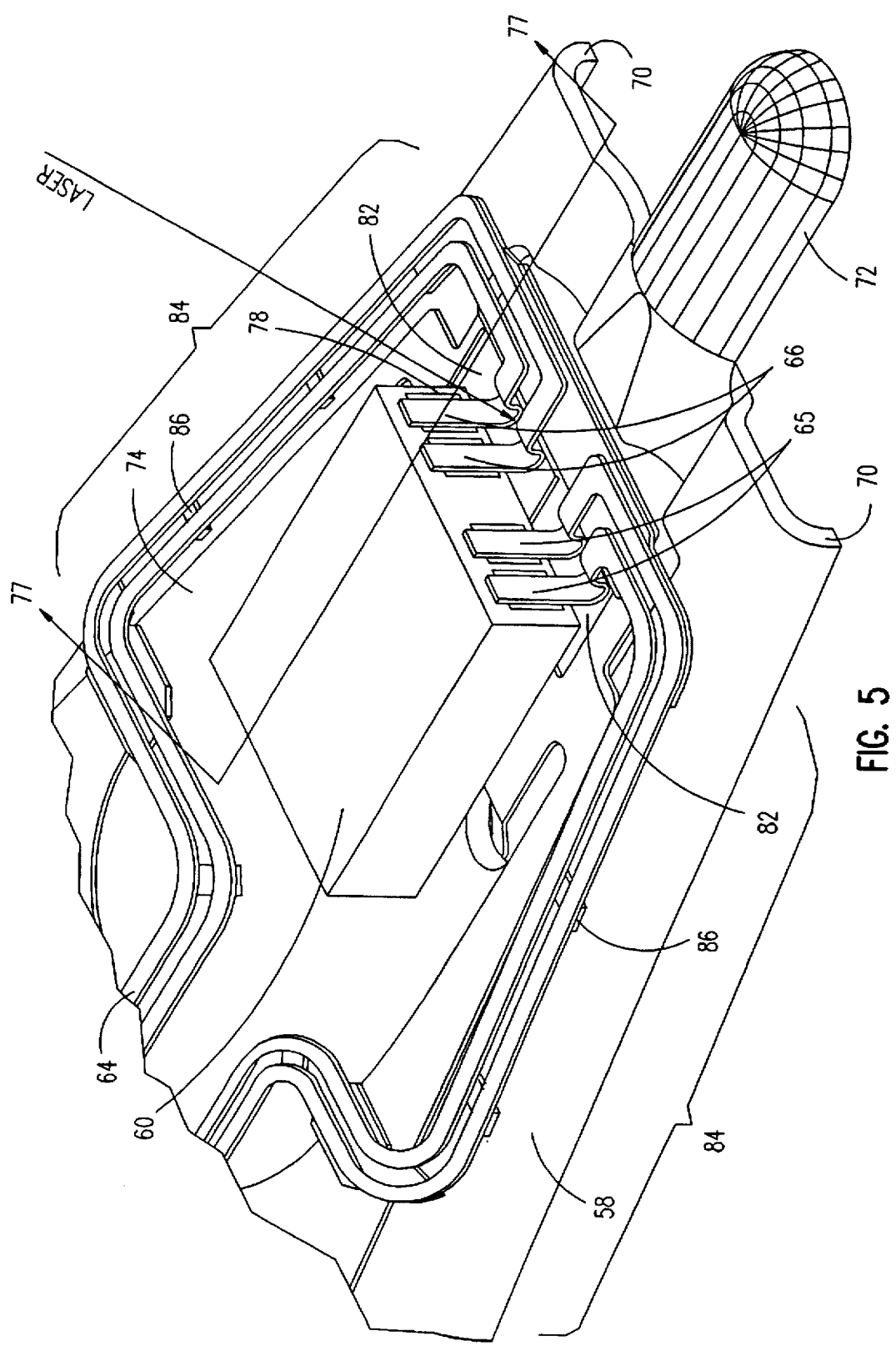
FIG. 5 is a perspective view of the slider region of the integrated suspension assembly in accordance with the present invention.

FIGS. 4–6, show various views of the preferred embodiment of an integrated suspension assembly 50 in accordance with the present invention. Particularly, FIG. 4 is a perspective view of the integrated suspension assembly having conductive leads formed on a flexure with a slider attached in the gimbal area of the suspension. FIG. 5 is an enlarged view of the gimbal area of the suspension, showing the bent conductive leads and laser treatment thereof. FIGS. 6 (a)–6 (d) show the various layers comprising the integrated suspension, and FIGS. 7(a)–(c) are side sectional views showing the bent conductive lead before, during and after laser treatment.

With reference to FIG. 4, it is seen that the primary pieces of this integrated suspension includes a load beam 58, a flexure 60 and a mount plate 62. One end of the load beam is fixedly attached to the actuator arm 146 using the mount plate 62 and the other end supports on its surface the flexure 60. The flexure 60 has integrated conductor leads 64 on its surface. The slider 48 is bonded to the tip end of the flexure 60, on the same surface as the leads. The slider 48 may be of the type which contains an integrated MR read sensor and an inductive write transducer. The mount plate 62 supports the ends of the leads 64. The leads 64 terminate at one end of the slider 48 and at the other end in a multi-connector 63 on the mount plate 62 for electrically connecting to the electronics of a control unit (shown in FIG. 3) via a flex cable (not shown).

FIG. 5 more clearly shows the slider region on the flexure 60. The leads 64 terminate on the contact pads 78 on the end face of the slider 48; one pair of the leads 65 in electrical connection with the MR read sensor, and the other pair of leads 66 being in electrical connection with the write transducer.

The conductive leads 64 may be bonded to the slider pads 78 by conventional ultrasonic bonding processes or by soldering processes. It is noted that the leads 64 are bent at their ends 65 and 66 so that they can be positioned with a flat surface against the pads 78 for bonding thereto.

Figure 6A:
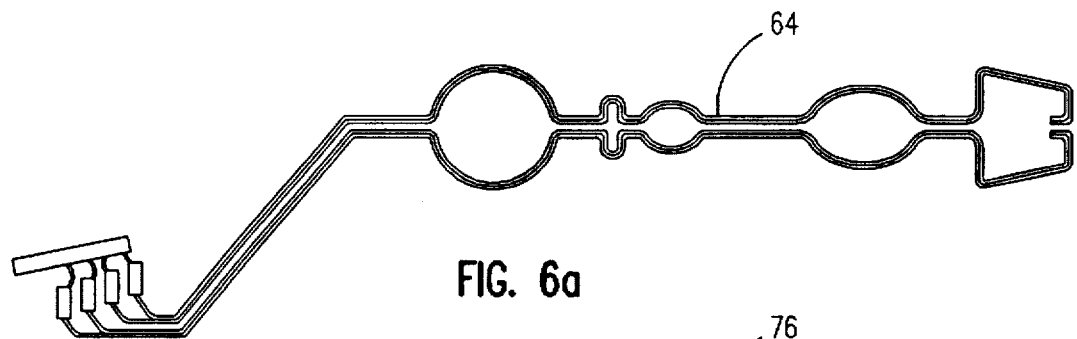
FIGS. 6 (a)–(d) are top views of the load beam and the sequence of the different layers of the flexure of the integrated suspension shown in FIG. 4.
Figure 6B:
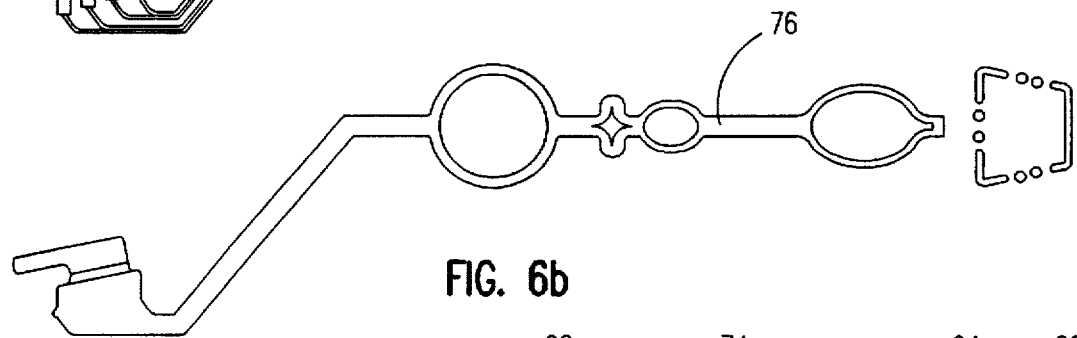
Figure 6C:
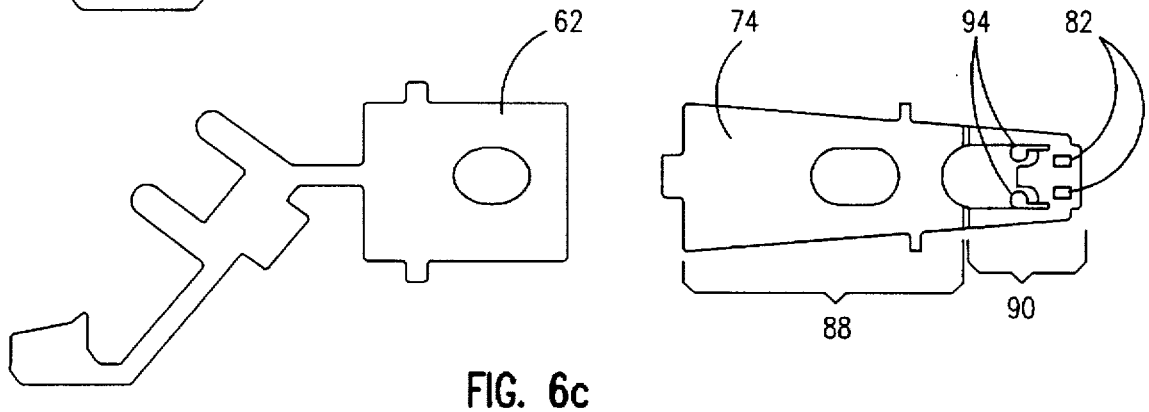
Figure 6D:
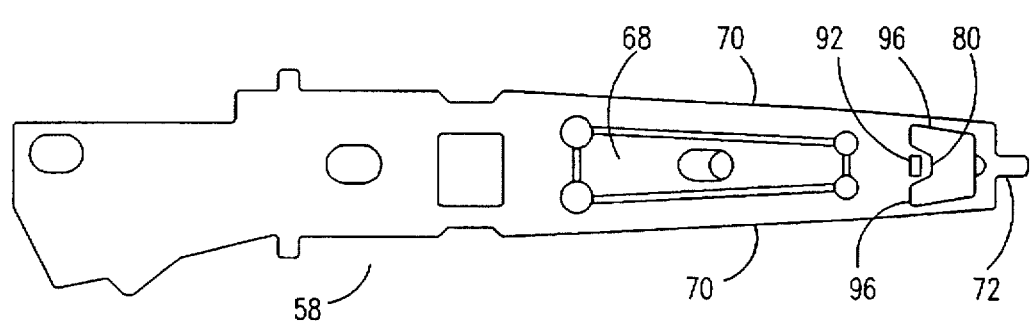
Figure 7C:
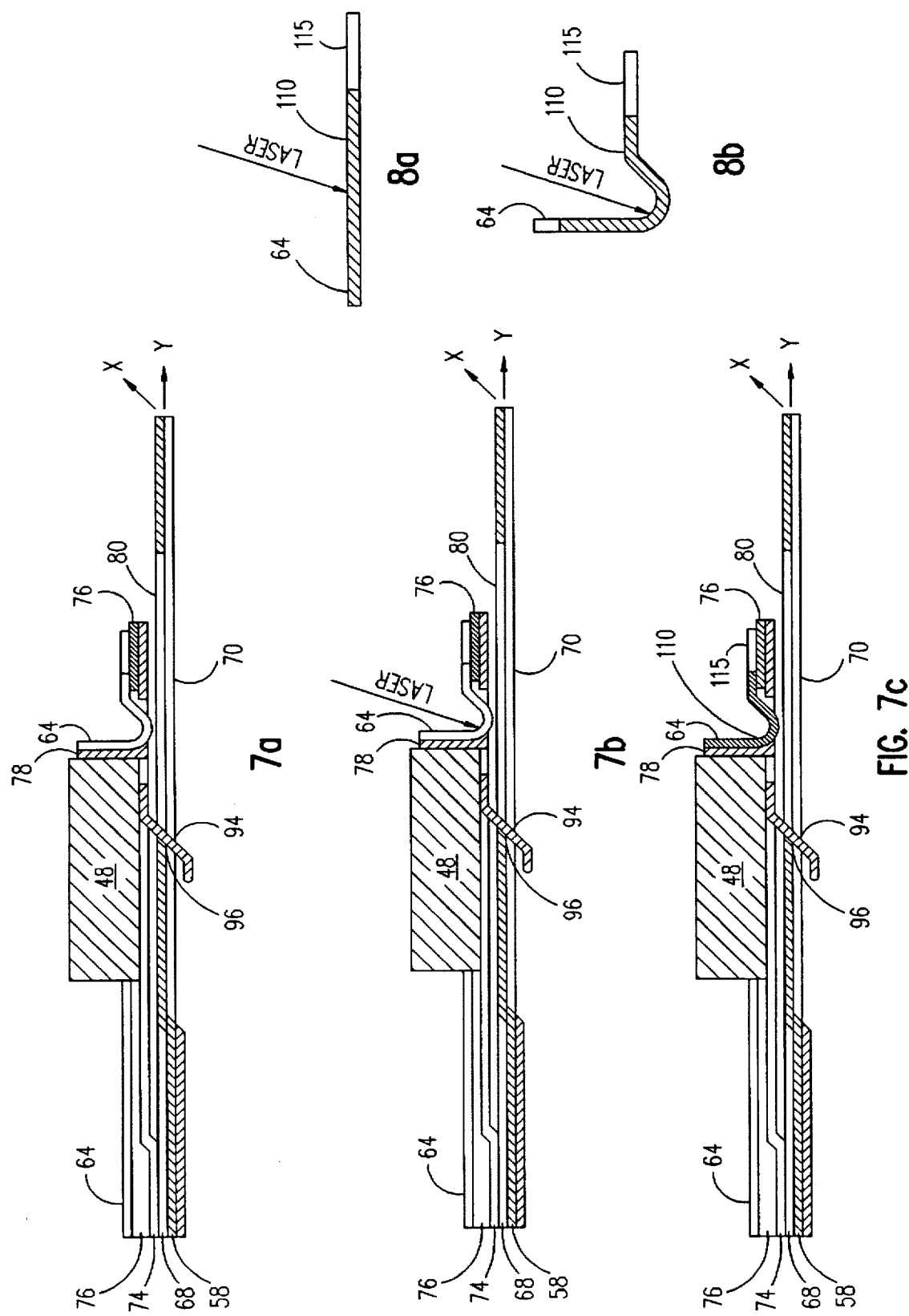
FIGS. 7 (a)–(c) is are sectional views taken along line 7—7 in FIG. 5 before laser treatment, during laser treatment and after laser treatment, respectively.

Referring now to FIGS. 6(a)–(d), a more detailed description of the structure of the various components and assembly is provided. With reference to FIG. 6(d), the load beam 58 is generally flat and rigid and made of stainless steel or other substrate materials. In the illustrated embodiment, the load beam 58 is stainless steel of about 0.04 to 0.05 mm thick. For a faster slider 48 positioning response in the disk drive system 130, it is desirable to maintain the weight and inertia of the load beam 58 as small as possible using thinner material without compromising its structural rigidity. The flexure 60 includes several layers of different materials in an integral structure. Referring to FIGS. 6 (a)–(c), the various layers of the flexure are indicated in a top down sequence in plan views. The structure layer, (hereinafter referred to as the spring layer 74) of the flexure 60 is a sheet of flexible material which may be stainless steel or other suitable material, and a thickness (about 18–20 microns in the illustrated embodiment) that can provide the desired elastic deflections. It may be shaped by etching or stamping processes. The layer of dielectric material 76 (polyimide, or Teflon for example) is an intermediate layer separating the spring layer 74 and the layer of conductive leads 64 (copper, for example). The dielectric 76 and lead layers 64 may be formed using conventional photolithographic processes well known in the art. The mount plate 62 may be of the same material as the spring layer 74 and formed in the same process as the spring layer 74. It is noted that sections of the leads 64 are positioned beyond the edges of the spring layer 74. These sections of the leads 64 are maintained in a fixed spaced apart relationship by the dielectric material 76 at several points along these sections. This lead 64 configuration is intended to eliminate their contact with the spring layer 74. The spring layer 74 needs to maintain flexibility for gimbal support of the slider 48 about its pitch and roll axes. Roll is defined as rotation about a longitudinal axis extending directly out from the actuator arm in the plane of the disk, and pitch is defined as rotation about an axis perpendicular to the roll axis but still lying in the plane of the disk.

As was seen in FIG. 5, the leads 64 were bent in the slider region of the flexure in order to terminate on the contact pads 78 on the end face of the slider. In order to relieve the internal stresses created by the forming of the leads by bending, the leads 64 are treated by localized infrared radiation to eliminate problems encountered with prior designs. With reference now to FIGS. 7 (a)–(c), the treatment of the leads is described. FIG. 7(a) shows an assembled head gimbal assembly wherein a slider 48 has been mounted on an integrated suspension 50. The leads 64 are bent at a 90° angle, and terminated to pads 78 and bonded thereto. In one embodiment, shown in FIG. 7(b), the portion of the leads proximate the slider pads 78 is subjected to localized infrared radiation. For example, laser energy is impinged upon the bent area of the conductive leads at the slider end of the suspension to relieve the mechanical stresses internal to the conductive metal leads.

Specifically, two 20 millisecond pulses from an Nd:YAG laser operating at 176–178V are focussed to approximately 100 micron spot on the bent area of the conductor leads as shown in FIG. 7(b). The laser energy used is in the range of 100–400 m Joules. The laser energy requirement will vary depending on the conductor material, state of cold work and lead dimensions.

With reference now to FIG. 7(c), the resulting conductors 64 have an altered section 110 and an unaltered section 115. The altered section 110, that which has been treated by laser light or IR light, is found to have a lower yield strength than the unaltered section 115. In both the altered section 110 and the unaltered section 115 of the conductor, the chemical composition of the material is identical, however, the microstructure in the altered section 110 is very different from that in unaltered sections 115. It has been found that the more uniform grain structure in the altered sections allows for plastic deformation to occur sooner than a non-uniform grain structure; the unaltered section 115 has more deformed and distorted grain structure due to the previous affects of the cold working of the material in the manufacturing process.

With reference to FIGS. 8(a)–(b), it is noted that the above described treatment of the leads 64 may also take place before the bending of the lead, as in FIG. 8(a), after the bending of the lead, as in FIG. 8(b), or both before and after lead formation.

The integrated suspension 50 in accordance with the present invention, where localized IR radiation treatment is used on the leads 64 in the slider region of the suspension, comprises conductive leads 64 with a reduced stress concentration and an increased metal elongation to eliminate cracking. It has been found that applying radiation before or after forming to reduce stresses and changes in flatness/static attitude of the section of the lead material next to the high stress zone ensures a constant shift in flatness and reduces variability.

The improved results of the novel suspension assembly disclosed herein are indicated in the table below, which compares pitch static attitude for untreated and treated conductors.

TABLE 1

| Pitch Static Attitude (Degrees) | | | | | |
| --- | --- | --- | --- | --- | --- |
| | Test Condition | | | | |
| | 1 | 2 | 3 | 4 | 5 |
| Means | −0.14 | 0.23 | 0.61 | −1.27 | −0.48 |
| Sigma | 1.24 | 0.35 | 0.38 | 0.68 | 0.40 |
| Max. | 2.80 | 1.30 | 1.80 | 0.40 | 0.40 |
| Min. | −3.25 | −0.30 | −0.10 | −0.28 | −1.50 |

Test Conditions:
1. HGA level after ultra-sonic bond without laser treatment (reference)
2. Suspension level as received (untreated)
3. Suspension level after first laser treatment
4. HGA level after condition (3) plus ultra-sonic lead bond
5. HGA level after condition (4) plus second laser treatment Table 1 compares the pitch static attitude for components that have not been laser treated with components that have been laser treated. It can be seen that the standard deviation without laser treatment is 1.24, after the leads have been ultrasonically bonded to the slider. Laser treatment of leads prior to bonding, reduces this standard deviation to 0.68 from 1.24 and moreover, post bond laser treatment further reduces the standard deviation to 0.40. The above results are for the purpose of demonstrating the benefits of laser treatment process. The results can be further improved by optimizing laser process parameters.

Figure 9:
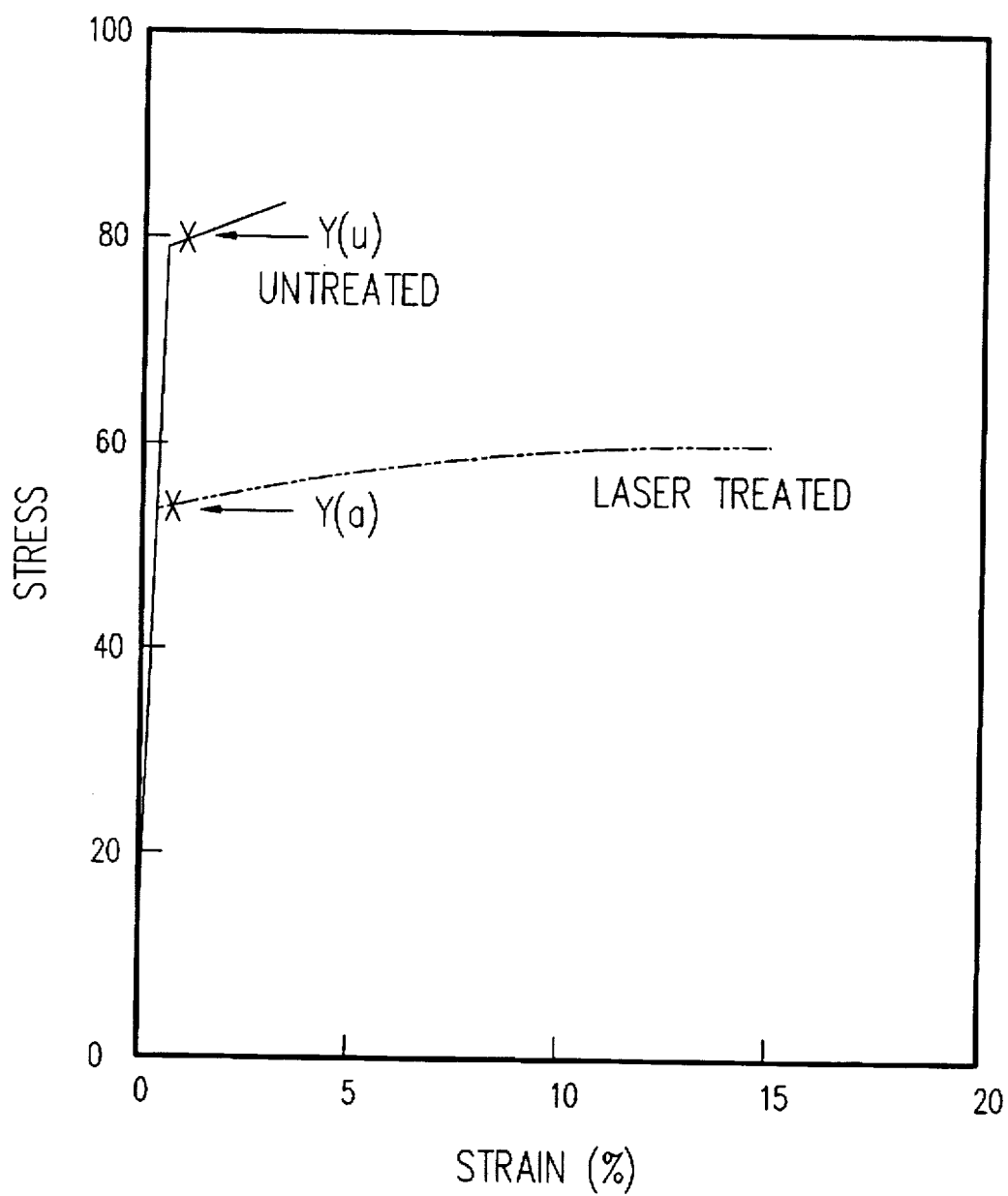
FIG. 9 is a graphical representation showing the stress-strain plots of a laser treated component and that of a non-laser treated component.

FIG. 9 is a stress-strain plot, a graphical representation of the comparative mechanical properties of material in the altered portion 110 and the unaltered portion 115 of the conductive lead 64. It can be seen that the yield stress of the material treated with laser (altered portion), indicated by Y(a) in the plot, is much lower than that of the untreated (unaltered portion) material shown by Y(u). The lowering of yield stress by laser treatment is also accompanied by an increase in the ductility of the material, indicated by strain (%).

One of the advantages of the present laser treatment processes is that by manipulating the yield stress locally in the conductive leads prior to bending the leads, the potential for cracking leads or out of flatness variations is greatly reduced. With respect to the presently used manufacturing process, the laser treatment of the conductive leads may be started just as prior to bending the leads, after bending the leads, or after ultrasonic bonding of the bent leads to the slider. If the spot size is larger than the lead width, a mask is needed. It should be apparent to one skilled in the art that the laser treatment described herein can also be used to treat conductors at the tail end where they attach to arm electronics cable, and any other narrow metalized components which are to be bent or formed to reduce the possibility of cracking; by localized annealing while maintaining high yield strength in other areas.

It should be understood that various changes and modifications to the presently preferred embodiments that are described herein will be apparent to those skilled in the art. Such changes and modifications can be made without departing from the spirit and scope of the present invention, and without diminishing its attendant advantages. It is, therefore, intended that such changes and modifications can be covered in the appended claims:

What is claimed is:

1. A method of assembling an integrated head gimbal assembly comprising:

providing a rigid load member and a flexure pivotally attached thereto, the flexure comprising a slider end, an actuator end, and a first flexure surface having a plurality of conductive leads formed thereon extending from the slider end of the flexure to the actuator end of the flexure, the conductive leads being bent at 90° angles at the slider end of the flexure;

impinging laser energy on the bent portions of the conductive leads, thereby annealing conductive leads;

mounting a slider on the first flexure surface at the slider end of the flexure such that an end face of the slider is proximate the annealed conductive leads; and bonding the annealed conductive leads to contact pads on the end face of the slider.

2. The method in accordance with claim 1, wherein the flexure is a laminate structure comprising: a support layer; an electrically conductive layer formed on the support layer as a plurality of electrically conductive traces; and an insulating layer of dielectric material disposed between the base layer and the conductive layer.

3. The method of claim 2, further comprising the step of impinging laser energy on the electrically conductive layer prior to lead formation thereon.

4. The method in accordance with claim 3, wherein the laser energy is directed from an Nd:YAG laser.

5. The method according to claim 4, wherein the conductive leads are further comprised of an altered section and an unaltered section, the altered section being the annealed portion of the conductive lead, and having a grain structure that is more uniform than the grain structure of the unaltered section.

6. A head gimbal assembly for use in a magnetic storage system comprising:

a rigid load member;

a flexure pivotally attached to the load member, the flexure comprising a slider end, and a first flexure surface;

a slider mounted on the first flexure surface at the slider end thereof, the slider comprising an end face having contact pads disposed thereon; and a plurality of conductive leads formed on the first flexure surface, said leads comprising an end portion near the slider end of the flexure, and in electrical contact with the slider, wherein the micro structure of the conductive leads at the end portion of the leads near the slider has a more uniform grain structure than other sections of the leads, whereby the end portions with the more uniform grain structure allows for better plastic deformation and reduced cracking.

7. The head gimbal assembly of claim 6, wherein the flexure is a laminate structure comprising:

a support layer;

an electrically conductive layer formed on the support layer as a plurality of electrically conductive traces; and an insulating layer of dielectric material disposed between the base layer and the conductive layer.

8. The head gimbal assembly of claim 7, wherein the end portions of the conductive leads are exposed to localized infrared radiation on the slider end of the flexible member prior to being bent at the front surface of the slider.

9. The integrated suspension assembly of claim 8, wherein the localized infrared radiation is a laser.

10. The head gimbal assembly of claim 7, wherein the end portions of the conductive leads are exposed to localized infrared radiation on the slider end of the flexible member prior to being bent at the front surface of the slider.

11. A data recording disk drive comprising:

a disk with a data surface of concentric data tracks;

means attached to the disk for rotating the disk about an axis generally perpendicular to the disk;

a slider maintained in operative relationship with the data surface when the disk is rotating;

a transducer attached to the slider for reading data from and writing data to the data surface;

an actuator for moving the slider generally radially relative to the disk to allow the transducer to access the data tracks;

an electronics module for processing data read from and written to the data surface; a suspension comprising a load beam, a flexure connected to said load beam, said flexure comprising a slider end, an actuator end and a first flexure surface; a plurality of electrically conductive leads interconnecting said transducer and said electronics module, each of said traces having a bonding area near each of its ends for connection to the transducer and the electronics module, wherein the micro structure of the conductive leads at the end portion of the leads near the slider has a more uniform grain structure than other sections of the leads, whereby the end portions with the more uniform grain structure allows for better plastic deformation and reduced cracking; and a generally rigid support arm having two ends, its first end attached to the suspension and its second end attached to the actuator.

12. The data recording disk drive of claim 11, wherein the slider is mounted on the first flexure surface at the slider end thereof, the slider comprising an end face having contact pads disposed thereon, further wherein the conductive leads comprise an end portion bent at a 90° angle such that the conductor end portion contacts the contact pads on the slider end face, and are in electrical contact with the slider; further wherein the conductive leads are annealed at their end portion.

13. The data recording disk drive of claim 11, the end portions of the conductive leads are exposed to localized infrared radiation on the slider end of the flexible member prior to being bent at the end face of the slider.

14. The data recording disk drive of claim 11, the end portions of the conductive leads are exposed to localized infrared radiation on the slider end of the flexible member after being bent at the end face of the slider.

15. A method of assembling an integrated head gimbal assembly comprising:

providing a rigid load member and a flexure pivotally attached thereto, the flexure comprising a slider end, an actuator end, and a first flexure surface having a plurality of conductive leads formed thereon extending from the slider end of the flexure to the actuator end of the flexure, wherein the micro structure of the conductive leads at the end portion of the leads near the slider has a more uniform grain structure than other sections of the leads, whereby the end potions with the more uniform grain structure allows for better plastic deformation and reduced cracking;

impinging laser energy on bent portions of the conductive leads proximate the slider end of the flexure, thereby annealing the conductive leads;

mounting a slider on the first flexure surface at the slider end of the flexure such that an end face of the slider is proximate the annealed conductive leads; and bonding the annealed conductive leads to contact pads on the end face of the slider.

16. The method in accordance with claim 15, wherein the flexure is a laminate structure comprising: a support layer; an electrically conductive layer formed on the support layer as a plurality of electrically conductive traces; and an insulating layer of dielectric material disposed between the base layer and the conductive layer.

17. The method of claim 16, further comprising the step of impinging laser energy on the electrically conductive layer prior to lead formation thereon.

18. The method in accordance with claim 17, wherein the laser energy is directed from an Nd:YAG laser.

19. The method according to claim 18, wherein the conductive leads are further comprised of an altered section and an unaltered section, the altered section being the annealed portion of the conductive lead, and having a grain structure that is more uniform than the grain structure of the unaltered section.

* * * * *